United States Patent
Li (10) Patent No.: US 10,432,034 B2
(45) Date of Patent: Oct. 1, 2019

(54) ON-OFF APPARATUS AND ELECTRONIC DEVICE

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 19 days.

(21) Appl. No.: 15/779,053

(22) PCT Filed: Nov. 22, 2016

(86) PCT No.: PCT/CN2016/106795
§ 371 (c)(1),
(2) Date: May 24, 2018

(87) PCT Pub. No.: WO2017/088733
PCT Pub. Date: Jun. 1, 2017

(65) Prior Publication Data
US 2018/0351413 A1 Dec. 6, 2018

(30) Foreign Application Priority Data

Nov. 27, 2015 (CN) .......................... 2015 1 0849252

(51) Int. Cl.
*H02J 50/20* (2016.01)
*H04B 5/00* (2006.01)
*H02J 50/12* (2016.01)

(52) U.S. Cl.
CPC .............. *H02J 50/20* (2016.02); *H02J 50/12* (2016.02); *H04B 5/0031* (2013.01); *H04B 5/0037* (2013.01); *H04B 5/0062* (2013.01); *H04B 5/0081* (2013.01)

(58) Field of Classification Search
CPC ........ H02J 50/20; H02J 50/12; H04B 5/0031; H04B 5/0037; H04B 5/0062; H04B 5/0081
See application file for complete search history.

(56) References Cited

FOREIGN PATENT DOCUMENTS

| CN | 102723747 A | 10/2012 |
|----|-------------|---------|
| CN | 103384962 A | 11/2013 |
| CN | 104063739 A | 9/2014 |
| CN | 104682541 A | 6/2015 |
| CN | 205319804 U | 6/2016 |

(Continued)

OTHER PUBLICATIONS

International Patent Application No. PCT/CN2016/106795; Int'l Written Opinion and the Search Report; dated Feb. 24, 2017; 8 pages.

(Continued)

*Primary Examiner* — Robert L Deberadinis
(74) *Attorney, Agent, or Firm* — BakerHostetler (57) ABSTRACT

An on-off apparatus and an electronic device are provided. The on-off apparatus includes: an AC input end, an AC output end, an on-off module, a first DC isolating component and a second DC isolating component. The on-off module includes a first pin, a second pin, a third pin, a fourth pin and a control pin. The third pin is connected to a DC power supply. The fourth pin is connected to ground. The control pin is configured to receive a control signal. The on-off module is configured to turn on or off a path between the third pin and the fourth pin under control of the control signal.

18 Claims, 5 Drawing Sheets

(56) References Cited

FOREIGN PATENT DOCUMENTS

EP          2816733 A1    12/2014
JP     2011-170525 A      9/2011

OTHER PUBLICATIONS

Niekerk et al.; "High Speed High Voltage PIN Diode Driver"; IEEE Proceedings of the 1998 South African Symposium on Comm. And Signal Processing-COMSIG; 1998; 6 pages.
European Patent Application No. 16867956.1; Extended Search Report; dated Apr. 18, 2019; 13 pages.

ON-OFF APPARATUS AND ELECTRONIC DEVICE

CROSS-REFERENCE TO RELATED APPLICATION

This application is a U.S. national phase application of International Application Serial No. PCT/CN2016/106795, filed on Nov. 22, 2016, which claims priority to Chinese Patent Application Serial No. 201510849252.6, filed with the State Intellectual Property Office of P. R. China on Nov. 27, 2015, and titled with "ON-OFF APPARATUS AND ELECTRONIC DEVICE".

TECHNICAL FIELD

The present disclosure relates to the field of electronic technologies, and particular to, an on-off apparatus and an electronic device.

BACKGROUND

In related arts, a coil is directly connected to a chip in an electronic device such as a smart card. When the smart card is placed in a radio frequency field, a chip circuit of the smart card consumes field energy to communicate with a card reader (such as Point of Sale (POS) terminal, Near Field Communication (NFC) mobile phone or the like). In practice, in order to save a size of the smart card, a battery is not generally set in the smart card. Therefore, an existing smart card generally does not have other power consumption components except the chip circuit.

With the development of the smart cards, there is a need to include other power consumption components in addition to the chip circuit in the smart card in related arts. For example, a display screen is set on the smart card for displaying information during a transaction process. In this condition, it is required to power the smart card. Therefore, it may be desirable to provide a power acquirement circuit in the smart card. The power acquirement circuit acquires electric energy from the coil. In this case, it may be unable to obtain optimal power-acquirement efficiency when the chip circuit and the power acquirement circuit share a common coil. However, adding a power acquirement coil may increase difficulty and cost of circuit designs, and also affects communication between the smart card and other devices. Therefore, a radio frequency carrier between the coil and the chip must be turned off when a common coil is used as the communication coil and the power acquirement coil. How to disconnect the radio frequency carrier between the coil and the chip is a technical problem to be solved in related arts.

SUMMARY

Embodiments of a first aspect of the present disclosure provide an on-off apparatus. The on-off apparatus includes an AC (alternating current) input end, an AC output end, an on-off module, a first DC isolating component and a second DC isolating component. The on-off module includes a first pin, a second pin, a third pin, a fourth pin and a control pin. The third pin is electrically connected to a DC power supply. The fourth pin is connected to a ground end. The control pin is configured to receive a control signal. The on-off module is configured to turn on or off a path between the third pin and the fourth pin under control of the control signal. When the path between the third pin and the fourth pin is turned on, a path between the first pin and the second pin is turned on. When the path between the third pin and the fourth pin is turned off, the path between the first pin and the second pin is turned off. The first DC isolating component is connected between the AC input end and the first pin. The first DC isolating component is configured to isolate a DC signal between the first pin and the AC input end and to transmit an AC signal between the first pin and the AC input end. The second DC isolating component is connected between the AC output end and the second pin. The second DC isolating component is configured to isolate a DC signal between the second pin and the AC output end and to transmit an AC signal between the second pin and the AC output end.

Embodiments of another aspect of the present disclosure provide another on-off apparatus. The apparatus includes an AC input port, an AC output port, an on-off module, a first DC isolating component, a second DC isolating component, a third DC isolating component and a fourth DC isolating component. The AC input port includes a first end and a second end. The AC output port includes a first end and a second end. The on-off module includes a first pin, a second pin, a third pin, a fourth pin, a fifth pin, a sixth pin and a control pin. The third pin is electrically connected to a DC power supply. The fourth pin is connected to a ground end. The first DC isolating component is connected between the first end of the AC input port and the first pin. The first DC isolating component is configured to isolate a DC signal between the first pin and the first end of the AC input port, and to transmit an AC signal between the first pin and the first end of the AC input port. The second DC isolating component is connected between the first end of the AC output port and the second por. The second DC isolating component is configured to isolate a DC signal between the second pin and the first end of the AC output port, and to transmit an AC signal between the second pin and the first end of the AC output port. The third DC isolating component is connected between the second end of the AC input port and the fifth pin. The third DC isolating component is configured to isolate a DC signal between the fifth pin and the second end of the AC input port, and to transmit an AC signal between the fifth pin and the second end of the AC input port. The fourth DC isolating component is connected between the second end of the AC output port and the sixth pin. The fourth DC isolating component is configured to isolate a DC signal between the sixth pin and the second end of the AC output port, and to transmit an AC signal between the sixth pin and the second end of the AC output port. The control pin is configured to receive a control signal. The on-off module is configured to turn on or off a path between the third pin and the fourth pin under control of the control signal. When the path between the third pin and the fourth pin is turned on, the path between the first pin and the second pin is turned on, and a path between the fifth pin and the sixth pin is turned on. When the path between the third pin and the fourth pin is turned off, the path between the first pin and the second pin is turned off, and the path between the fifth pin and the sixth pin is turned off.

Embodiments of still another aspect of the present disclosure provide an electronic device. The electronic device includes a coil, a chip having a contactless function and the on-off apparatus described above. The coil is connected to the AC input end (or port) of the on-off apparatus, and the chip having the contactless function is connected to the AC output end (or port) of the on-off apparatus.

BRIEF DESCRIPTION OF THE DRAWINGS

To describe the technical solutions in the embodiments of the present invention more clearly, drawings required for describing embodiments of the present disclosure will be described briefly. Apparently, the drawings in the following description are merely some embodiments of the present disclosure. For those skilled in the art, other drawings may be obtained based on these accompanying drawings without creative efforts.

DETAILED DESCRIPTION

Technical solutions in the embodiments of the present disclosure will be clearly and completely described with reference to the drawings of the embodiments of the present disclosure. Apparently, the described embodiments are merely a part but not all of the embodiments of the present disclosure. All other embodiments obtained by those skilled in the art based on the embodiments of the present disclosure without creative efforts shall fall within a protection scope of the present disclosure.

In the description of the present disclosure, it is to be understood that, terms "first" and "second" are merely used for descriptive purposes and cannot be interpreted as indicating or implying relative importance or quantity or position.

Embodiments of a first aspect of the present disclosure provide an on-off apparatus. The on-off apparatus includes an AC (alternating current) input end, an AC output end, an on-off module, a first DC isolating component and a second DC isolating component. The on-off module includes a first pin, a second pin, a third pin, a fourth pin and a control pin. The third pin is electrically connected to a DC power supply. The fourth pin is connected to a ground end. The control pin is configured to receive a control signal. The on-off module is configured to turn on or off a path between the third pin and the fourth pin under control of the control signal. When the path between the third pin and the fourth pin is turned on, a path between the first pin and the second pin is turned on. When the path between the third pin and the fourth pin is turned off, the path between the first pin and the second pin is turned off. The first DC isolating component is connected between the AC input end and the first pin. The first DC isolating component is configured to isolate a DC signal between the first pin and the AC input end and to transmit an AC signal between the first pin and the AC input end. The second DC isolating component is connected between the AC output end and the second pin. The second DC isolating component is configured to isolate a DC signal between the second pin and the AC output end and to transmit an AC signal between the second pin and the AC output end.

Alternatively, the on-off module includes a first load, a second load, a control module and a first unidirectional conduction module. The control module is connected to the control pin. The control module is connected between the third pin and the first load or between the fourth pin and the second load, and is configured to turn on or off the path between the third pin and the fourth pin under the control of the control signal. The first unidirectional conduction module is connected between the first load and the second load and between the first pin and the second pin, and is configured to turn on the path between the first pin and the second pin when the path between the third pin and the fourth pin is turned on, and to turn off the path between the first pin and the second pin when the path between the third pin and the fourth pin is turned off.

Embodiments of another aspect of the present disclosure provide another on-off apparatus. The apparatus includes an AC input port, an AC output port, an on-off module, a first DC isolating component, a second DC isolating component, a third DC isolating component and a fourth DC isolating component. The AC input port includes a first end and a second end. The AC output port includes a first end and a second end. The on-off module includes a first pin, a second pin, a third pin, a fourth pin, a fifth pin, a sixth pin and a control pin. The third pin is electrically connected to a DC power supply. The fourth pin is connected to a ground end. The first DC isolating component is connected between the first end of the AC input port and the first pin. The first DC isolating component is configured to isolate a DC signal between the first pin and the first end of the AC input port, and to transmit an AC signal between the first pin and the first end of the AC input port. The second DC isolating component is connected between the first end of the AC output port and the second por. The second DC isolating component is configured to isolate a DC signal between the second pin and the first end of the AC output port, and to transmit an AC signal between the second pin and the first end of the AC output port. The third DC isolating component is connected between the second end of the AC input port and the fifth pin. The third DC isolating component is configured to isolate a DC signal between the fifth pin and the second end of the AC input port, and to transmit an AC signal between the fifth pin and the second end of the AC input port. The fourth DC isolating component is connected between the second end of the AC output port and the sixth pin. The fourth DC isolating component is configured to isolate a DC signal between the sixth pin and the second end of the AC output port, and to transmit an AC signal between the sixth pin and the second end of the AC output port. The control pin is configured to receive a control signal. The on-off module is configured to turn on or off a path between the third pin and the fourth pin under control of the control signal. When the path between the third pin and the fourth pin is turned on, the path between the first pin and the second pin is turned on, and a path between the fifth pin and the sixth pin is turned on. When the path between the third pin and the fourth pin is turned off, the path between the first pin and the second pin is turned off, and the path between the fifth pin and the sixth pin is turned off.

Alternatively, the on-off module includes a first load, a second load, a second unidirectional conduction module, a third load, a third unidirectional conduction module and a control module. The control module is connected to the control pin. The control module is connected between the third pin and the first load, or the control module is connected between the fourth pin and the second load, and is configured to turn on or off the path between the third pin and the fourth pin under the control of the control signal. The second unidirectional conduction module is connected between the first load and the third load. The third unidirectional conduction module is connected between the third load and the second load. The first pin is arranged at a connection point between the second unidirectional conduction module and the third load and is connected to the first DC isolating component. The second pin is arranged at a connection point between the first load and the second unidirectional conduction mode, and is connected to the second DC isolating component. The fifth pin is arranged at a connection point between the second load and the third unidirectional conduction component, and is connected to the third DC isolating component. The sixth pin is arranged at a connection point between the third load and the third unidirectional conduction module, and is connected to the fourth DC isolating component. The second unidirectional conduction module is configured to turn on the path between the first pin and the second pin when the path between the third pin and the fourth pin is turned on, and to turn off the path between the first pin and the second pin when the path between the third pot and the fourth pin is turned off. The third unidirectional conduction module is configured to turn on the path between the fifth pin and the sixth pin when the path between the third pin and the fourth pin is turned on, and to turn off the path between the fifth pin and the sixth pin when the path between the third pin and the fourth pin is turned off.

Alternatively, the first unidirectional conduction module includes a first PIN (positive-intrinsic-negative) diode, the second unidirectional conduction module includes a second PIN diode, and the third unidirectional conduction module includes a third PIN diode.

Alternatively, the first load, the second load and the third load have the same resistance value, and a resistance value of the first load, a resistance value of the second load and a resistance value of the third load are greater than a predetermined value.

Alternatively, the first load has the same resistance value with the second load, and a resistance value of the first load and a resistance value of the second load are greater than a predetermined value.

Alternatively, a filter component is also included. An end of the filter component is electrically connected to a connection point between the DC power supply and the third pin, and another end of the filter component is connected to the ground end.

Embodiments of still another aspect of the present disclosure provide an electronic device. The electronic device includes a coil, a chip having a contactless function and the on-off apparatus described above. The coil is connected to the AC input end (or port) of the on-off apparatus, and the chip having the contactless function is connected to the AC output end (or port) of the on-off apparatus.

Alternatively, a rectifying apparatus is also included. The rectifying apparatus is electrically connected to the coil and includes an input end and an output end. The input end of the rectifying apparatus is electrically connected to the coil and is configured to receive an AC signal output by the coil. The output end of the rectifying apparatus is configured to output electrical energy.

Alternatively, the output end of the rectifying apparatus is electrically connected to the on-off apparatus, and is configured to provide the DC power supply for the on-off module.

The embodiments of the present disclosure will be described in detail with reference to the drawings.

Embodiment 1

The embodiment of the present disclosure provides an on-off apparatus. The on-off apparatus may be applied to an electronic device having a coil. The on-off apparatus is configured to connect the coil to or disconnect the coil from a certain functional module (such as a chip having a contactless function) of the electronic device.

Figure 1:
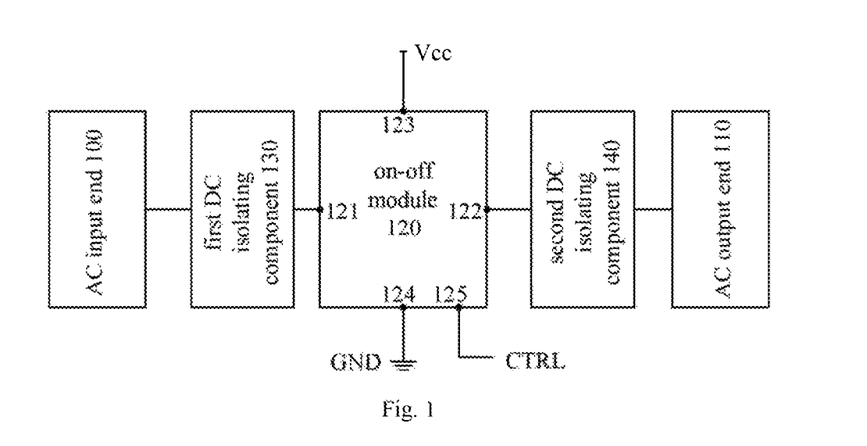
FIG. 1 is a schematic diagram of an on-off apparatus provided in Embodiment 1 of the present disclosure.

FIG. 1 is a schematic diagram of an on-off apparatus provided in this embodiment. As illustrated in FIG. 1, the on-off apparatus mainly includes an AC input end 100, an AC output end 110, an on-off module 120, a first DC isolating component 130 and a second DC isolating component 140. An end of the coil is connected to the AC input end 100, while another end of the coil is connected to a ground end. The AC output end 110 may be connected to a certain functional module (such as a chip having a contactless function) of the electronic device. The functional module and the coil are commonly grounded. A specific structure of the functional module is not limited in embodiments of the present disclosure.

As illustrated in FIG. 1, the on-off module 120 may include a first pin 121, a second pin 122, a third pin 123, a fourth pin 124 and a control pin 125. The third pin 123 is electrically connected to a DC power supply (VCC). The fourth pin 124 is connected to the ground end. The control pin 125 is configured to receive a control signal. The on-off module 120 is configured to turn on or off a path between the third pin 123 and the fourth pin 124 under control of the control signal. In a case that the path between the third pin 123 and the fourth pin 124 is turned on, the path between the first pin 121 and the second pin 122 is turned on, such that a path from the AC input end 100 to the AC output end 110 is turned on. In a case that the path between the third pin 123 and the fourth pin 124 is turned off, the path between the first pin 121 and the second pin 122 is turned off, such that the path from the AC input end 100 to the AC output end 110 is turned off. In this embodiment, the on-off module 120 may include one switch-on module which may be commonly used by the path between the third pin 123 and the fourth pin 124 as well as the path between the first pin 121 and the second pin 122. The switch-on module may be switched on when the on-off module 120 turns on the path between the third pin 123 and the fourth pin 124, and may be switched off when the on-off module 120 turns off the path between the third pin 123 and the fourth pin 124. Therefore the switch-on module may be switched on or off by controlling the path between the third pin 123 and the fourth pin 124 to turn on or off, and the path between the first pin 121 and the second pin 122 may be controlled to turn on or off by the switch-on or switch-off of the switch-on module.

The first DC isolating component 130 is connected between the AC input end 100 and the first pin 121. The first DC isolating component 130 is configured to isolate a DC signal between the first pin 121 and the AC input end 100 and to transmit an AC signal between the first pin 121 and the AC input end 100. With the first DC isolating component 130, when the path from the DC power supply to the ground is turned on, the DC signal is unable to be transmitted to the AC input end 100 through the first DC isolating component 130. Therefore, the function of the coil may be not affected.

The second DC isolating component 140 is connected between the AC output end 110 and the second pin 122. The second DC isolating component 140 is configured to isolate a DC signal between the second pin 122 and the AC output end 110 and to transmit an AC signal between the second pin 122 and the AC output end 110. With the second DC isolating component 140, when the path from the DC power supply to the ground is turned on, the DC signal is unable to be transmitted to the AC output end 110 through the second DC isolating component 140. Therefore, communication between the coil and a module arranged behind the AC output end 110 may be not affected.

The above on-off apparatus provided in this embodiment may be arranged between the coil of the electronic device and the certain functional module of the electronic device, and may be configured to connect the coil to or disconnect the coil from the functional module (such as the chip having the contactless function). Therefore, the functional module may share one coil with another functional module (such as a power acquirement circuit), thereby saving cost.

Figure 2:
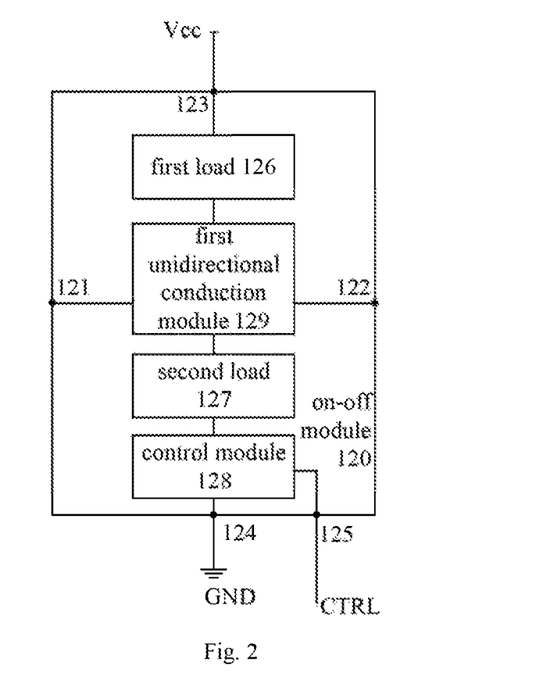
FIG. 2 is a schematic diagram of an alternative on-off apparatus provided in Embodiment 1 of the present disclosure.

In an alternative implementation solution of embodiments of the present disclosure, as illustrated in FIG. 2, the on-off module 120 may further include a first load 126, a second load 127, a control module 128 and a first unidirectional conduction module 129.

The control module 128 is connected to the control pin 125. The control module 128 is connected between the third pin 123 and the first load 126, or the control module 128 is connected between the fourth pin 124 and the second load 127. The control module 128 is configured to turn on or off the path between the third pin 123 and the fourth pin 124 under the control of the control signal. That is, in this embodiment, the control module 128 may be connected between the third pin 123 and the first load 126 for turning on or off the electrical connection (illustrated as FIG. 2) between the DC power supply and the first load 126, or the control module 128 may be connected between the fourth pin 124 and the second load 127 for turning on or off the electrical connection between the second load 127 and the ground. This embodiment is not limited thereto.

In an alternative implementation solution of embodiments of the present disclosure, the control module 128 may include a first connection pin, a second connection pin and a control pin. The first connection pin is electrically connected to the third pin 123, and the second connection pin is electrically connected to the first load 126. Alternatively, the first connection pin is electrically connected to the second load 127 and the second connection pin is electrically connected to the ground. The control pin is configured to receive the control signal and to control connection or disconnection between the first connection pin and the second connection pin under the control of the control signal. This alternative implementation solution makes the control module 128 to be implemented via an existing component or via an integrated chip, which extends implementation ways of the control module 128.

In an alternative implementation solution of embodiments of the present disclosure, the control module 128 may be a NMOS (N-channel metal oxide semiconductor) transistor, of which a drain electrode (D) functions as the first connection pin of the control module 128, a source electrode (S) functions as the second connection pin of the control module 128, and a gate electrode (G) functions as the control pin of the control module 128. The electrical path between the source electrode (S) and the drain electrode (D) is turned on or turned off according to the control signal input at the gate electrode (G). Certainly, the control module 128 may also be a PMOS (P-channel metal oxide semiconductor) transistor. Connections of the electrodes may be set with reference to conduction conditions of the PMOS transistor, which is not limited herein. The MOS (metal oxide semiconductor) is configured as the control module 128, which may simply the implementation of the circuit and save the cost.

The first unidirectional conduction module 129 is connected between the first load 126 and the second load 127 and between the first pin 121 and the second pin 122, and is configured to turn on the path between the first pin 121 and the second pin 122 in a case that the path between the third pin 123 and the fourth pin 124 is turned on, and to turn off the path between the first pin 121 and the second pin 122 in a case that the path between the third pin 123 and the fourth pin 124 is turned off. That is, in this embodiment, the first unidirectional conduction module 129 has such functions. In the case that the path between the third pin 123 and the fourth pin 124 is turned on, the first unidirectional conduction module 129 is equivalent to a resistor with a very small resistance value. The AC signal inputted at the AC input end 100 may be transmitted to the AC output end 110 through the first DC isolating component 130, the first unidirectional conduction module 129 and the second DC isolating component 140. In the case that the path between the third pin 123 and the fourth pin 124 is turned off, the first unidirectional conduction module 129 is equivalent to a resistor with a very large resistance value, and is equivalent to a disconnection point. The AC signal inputted at the AC input end 100 cannot be transmitted through the first unidirectional conduction module 129 to the AC output end 110. That is, the path from the AC input end 100 to the AC output end 110 is turned off.

In an alternative implementation way of this embodiment, the first unidirectional conduction module 129 may include a first PIN (positive-intrinsic-negative) diode. That is, the first unidirectional conduction module 129 may be implemented as the PIN diode. The PIN diode has a prefect switch-off characteristic, when the PIN diode is switched off. When being switched off, the PIN diode is equivalent to a capacitor of 0.2 pF which may block the AC signal between the AC input end 100 and the AC output end 110. That is, the carrier signal from the AC input end 100 to the AC output end 110 is isolated. When the PIN diode is switched on, the PIN diode is equivalent to a resistor having a resistance value inversely proportional to a conduction current, i.e., the greater the conduction current, the smaller the resistance value. Therefore, the AC signal may be transmitted from the AC input end 100 to the AC output end 110. In this alternative implementation way, the first unidirectional conduction module 129 may be implemented as the PIN diode. Therefore the circuit structure is simple and the cost is low. Certainly, embodiments of the present disclosure are not limited thereto. In addition to the PIN diode, the first unidirectional conduction module 129 may be also implemented in other ways, for example, as an integrated chip, which is not limited in this embodiment.

In an alternative implementation solution of embodiments of the present disclosure, in order to maintain a resonant quality factor value (Q) of the coil connected to the AC input end 100, the first load 126 and the second load 127 have the same resistance value, and the resistances values of the first load 126 and the second load 127 both are greater than a predetermined value. In a specific application, the first load 126 and the second load 127 may be resistors. For example, the first load 126 and the second load 127 each may be a resistor of 1.6 kilo-ohm. Certainly, embodiments of the present disclosure are not limited thereto. In practice, the first load 126 and the second load 127 each may also be another element or component having a certain resistance value, which is not limited in embodiments of the present disclosure.

The resistance value of the first load 126 and the resistance value of the second load 127 may be determined according to the conduction condition of the PIN diode used as the first unidirectional conduction module 129. That is, the resistance value of the first load 126 and the resistance value of the second load 127 satisfy the following conditions. In the case that the path between the third pin 123 and the fourth pin 124 is turned on, the resistance value is maximum when a current in the path between the third pin 123 and the fourth pin 124 is not smaller than the conduction current of the PIN diode used as the first unidirectional conduction module 129.

In an alternative implementation solution of embodiments of the present disclosure, the apparatus may further include a filter component. An end of the filter component is electrically connected to a connection point between the DC power supply and the third pin 123, and another end of the filter component is connected to the ground end. As an alternative way, the filter component may be a capacitor or another component having a filtering function, which is not limited in this embodiment. Electric energy provided by the DC power supply is stored by the filter component, which may effectively cancel noise presented in a high level signal of the DC power supply introduced at the third pin 123, so as to smooth the high level signal.

In a specific application, the above first DC isolating component 130 and the second DC isolating component 140 each may be implemented by a capacitor having a capacitance value greater than a predetermined value (that is, the predetermined value enables the capacitor to achieve a DC isolating function and to turn on a path between two ends of the capacitor, such as the predetermined value is 0.2 pF). Certainly, embodiments of the present disclosure are not limited thereto. In a specific application, this may be realized by other components having the DC isolating function, which is not limited in embodiments of the present disclosure.

Figure 3:
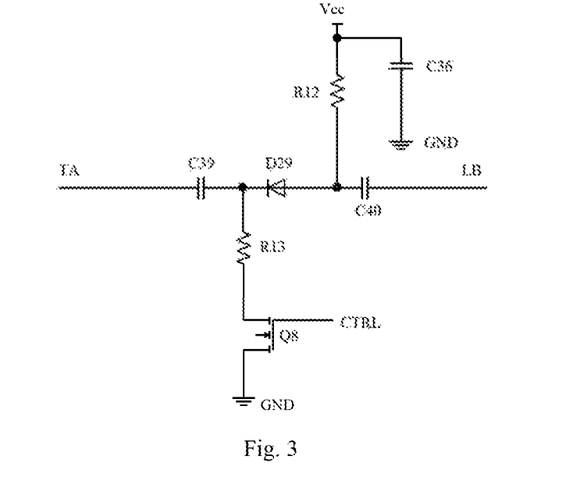
FIG. 3 is a schematic diagram of a circuit principle of an alternative on-off apparatus provided in Embodiment 1 of the present disclosure.

FIG. 3 is a schematic diagram of a circuit principle of an alternative on-off apparatus provided in this embodiment. As illustrated in FIG. 3, in this embodiment, the AC input end TA is connected in series to a capacitor C39, a PIN diode D29, a capacitor C40 and the AC output end LA in sequence. A negative electrode of the PIN diode D29 is connected to the capacitor C39, and a positive electrode of the PIN diode D29 is connected to the capacitor C40. An end of a resistor R12 is connected to a connection point between D29 and C40, and another end of the resistor R12 is connected to the DC power supply. An end of a resistor R13 is connected to a connection point between C39 and D29, while another end of the resistor R13 is connected to a D electrode of the NMOS transistor Q8 (a FDV301 typed NMOS transistor may also be used). An S electrode of the NMOS transistor Q8 is connected to the ground end. A G electrode of the NMOS transistor Q8 is connected to the control pin, for receiving the control signal (CTRL). The NMOS transistor Q8 is switched on or off under the control of the control signal, thereby turning on or off the path from the DC power supply to the ground. An end of the capacitor C36 is connected to a connection point between the DC power supply and the resistor R12 and another end of the capacitor C36 is connected to the ground end. When the path from the DC power supply to the ground is turn on, due to the characteristic of the PIN diode that the PIN diode is equivalent to a resistor when switched on, the AC signal input at the AC input end TA may be transmitted to the AC output end LA through D29. Further, due to the DC isolating and AC passing function of the capacitor, the DC signal from the DC power supply may not flow to the AC input end TA and the AC output end LA through the capacitors C39 and C40. Therefore, the transmission of the AC signal may be not affected. When the path from the DC power supply to the ground is turned off, due to the characteristic of the PIN diode that the PIN diode is equivalent to a capacitor of 0.2 pF when switched off, the AC signal between the AC input end TA and the AC output end TB may be isolated. That is, the carrier signal from the AC input end TA to the AC output end TB is blocked.

In the above embodiments, a capacitor of 10 nF may be used as the capacitors C36, C39 and C40. A resistor of 1.6 K ohm may be used as the resistors R12 and R13. Certainly, embodiments of the present disclosure are not limited thereto. In practice, other similar components may also be used.

Embodiment 2

The embodiment of the present disclosure provides an on-off apparatus. The on-off apparatus may be applied to an electronic device having a coil. The on-off apparatus is configured to connect the coil to or disconnect the coil from a certain functional module (such as a chip having a contactless function) of the electronic device.

The on-off apparatus provided in this embodiment is different from the on-off apparatus provided in embodiment 1 at that, in this embodiment, an antenna (the coil) communicates with the above functional module via two lines; while in embodiment 1, the coil communicates with the above functional module via a single line.

Figure 4:
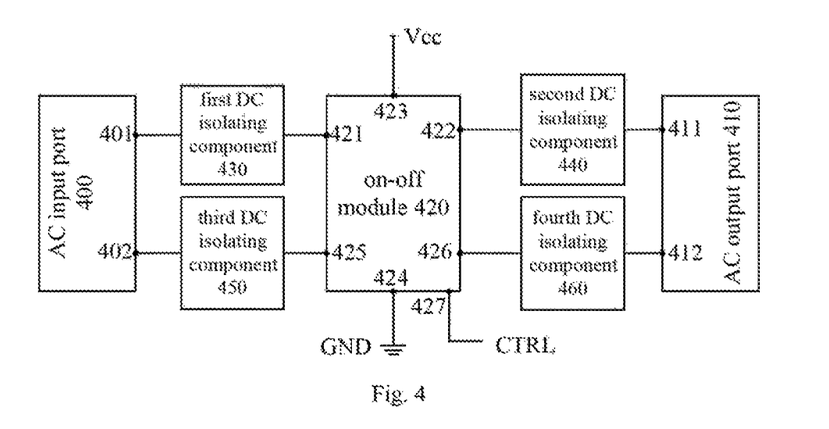
FIG. 4 is a schematic diagram of an on-off apparatus provided in Embodiment 2 of the present disclosure.

FIG. 4 is a schematic diagram of an on-off apparatus provided in this embodiment. As illustrated in FIG. 4, the on-off apparatus mainly includes an AC input port 400, an AC output port 410, an on-off module 420, a first DC isolating component 430, a second DC isolating component 440, a third DC isolating component 450 and a fourth DC isolating component 460.

As illustrated in FIG. 4, the AC input port 400 includes a first end 401 and a second end 402. The AC output port 410 includes a first end 411 and a second end 412. In this embodiment, the first end 401 of the AC input port 400 may be connected to an end of the coil, and the second end 402 of the AC input port 400 may be connected to another end of the coil. The first end 411 and the second end 412 of the AC output port 410 may be connected to an input end and an output end of the certain functional module (such as the chip having the contactless function, not illustrated) of the electronic device correspondingly.

As illustrated in FIG. 4, the on-off module 420 may include a first pin 421, a second pin 422, a third pin 423, a fourth pin 424, a fifth pin 425, a sixth pin 426 and a control pin 427. The third pin 423 is electrically connected to a DC power supply and the fourth pin 424 is connected to a ground end.

The first DC isolating component 430 is connected between the first end 401 of the AC input port 400 and the first pin 421. The first DC isolating component 430 is configured to isolate a DC signal between the first pin 421 and the first end 401 of the AC input port 400, and to transmit an AC signal between the first pin 421 and the first end 401 of the AC input port 400. With the first DC isolating component 430, when a path from the DC power supply to the ground is turned on, the DC signal cannot be transmitted through the first DC isolating component 430 to the first end 401 of the AC input port 400. Therefore, functions of the coil may be not influenced.

The second DC isolating component 440 is connected between the first end 411 of the AC output port 410 and the second pin 422. The second DC isolating component 440 is configured to isolate a DC signal between the second pin 422 and the first end 411 of the AC output port 410, and to transmit an AC signal between the second pin 422 and the first end 411 of the AC output port 410. With the second DC isolating component 440, when the path from the DC power supply to the ground is turned on, the DC signal cannot be transmitted through the second DC isolating component 440 to the first end 411 of the AC output port 410. Therefore, communication between the coil and a module behind the AC output port 410 may be not influenced.

The third DC isolating component 450 is connected between the second end 402 of the AC input port 400 and the fifth pin 425. The third DC isolating component 450 is configured to isolate a DC signal between the fifth pin 425 and the second end 402 of the AC input port 400, and to transmit an AC signal between the fifth pin 425 and the second end 402 of the AC input port 400. With the third DC isolating component 450, when the path from the DC power supply to the ground is turned on, the DC signal cannot be transmitted through the third DC isolating component 450 to the second end 402 of the AC input port 400. Therefore, the function of the coil may be not influenced.

The fourth DC isolating component 460 is connected between the second end 412 of the AC output port 410 and the sixth pin 426. The fourth DC isolating component 460 is configured to isolate a DC signal between the sixth pin 426 and the second end 412 of the AC output port 410, and to transmit an AC signal between the sixth pin 426 and the second end 412 of the AC output port 410. With the fourth DC isolating component 460, when the path from the DC power supply to the ground is turned on, the DC signal cannot be transmitted through the fourth DC isolating component 460 to the second end 412 of the AC output port 410. Therefore, communication between the coil and the module behind the AC output port 410 may be not influenced.

The control pin 427 is configured to receive a control signal. The on-off module 420 is configured to turn on or off the path between the third pin 423 and the fourth pin 424 under control of the control signal. In a case that the path between the third pin 423 and the fourth pin 424 is turned on, a path between the first pin 421 and the second pin 422 is turned on, and a path between the fifth pin 425 and the sixth pin 426 is turned on. In a case that the path between the third pin 423 and the fourth pin 424 is turned off, the path between the first pin 421 and the second pin 422 is turned off, and the path between the fifth pin 425 and the sixth pin 426 is turned off.

In this embodiment, the on-off module 420 may include one switch-on module which may be commonly used by the path between the third pin 423 and the fourth pin 424, the path between the first pin 421 and the second pin 422, as well as the path between the fifth pin 425 and the sixth pin 426. The switch-on module may be switched on when the on-off module 420 turns on the path between the third pin 423 and the fourth pin 424, and may be switched off when the on-off module 420 turns off the path between the third pin 423 and the fourth pin 424. Therefore, the switch-on module may be switched on or off by controlling the path between the third pin 423 and the fourth pin 424 to turn on or off, and the path between the first pin 421 and the second pin 422 and the path between the fifth pin 425 and the sixth pin 426 may be controlled to turn on or off by the switch-on or switch-off the switch-on module.

The above on-off apparatus provided in this embodiment may be arranged between the coil of the electronic device and the certain functional module of the electronic device, and may be configured to connect the coil to or disconnect the coil from the certain functional module (such as the chip having the contactless function). Therefore, the functional module may share one coil with another functional module (such as a power acquirement circuit).

Figure 5:
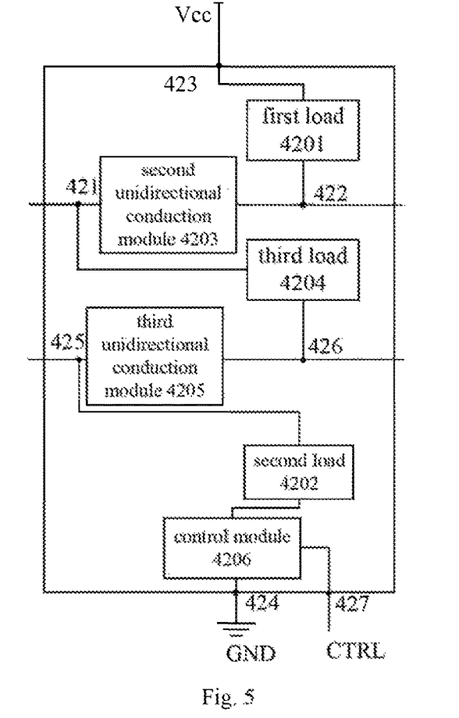
FIG. 5 is a schematic diagram of an alternative on-off apparatus provided in Embodiment 2 of the present disclosure.

In an alternative implementation solution of embodiments of the present disclosure, as illustrated in FIG. 5, the on-off module 420 may further include a first load 4201, a second load 4202, a second unidirectional conduction module 4203, a third load 4204, a third unidirectional conduction module 4205 and a control module 4206. The control module 4206 is connected to the control pin 427. And the control module 4206 is connected between the third pin 423 and the first load 4201, or the control module 4206 is connected between the fourth pin 424 and the second load 4202. The control module 4206 is configured to turn on or off the path between the third pin 423 and the fourth pin 424 under the control of the control signal. That is, in this embodiment, the control module 4206 may be connected between the third pin 423 and the first load 4201 for turning on or off the electrical path between the DC power supply and the first load 4201, or may be connected between the fourth pin 424 and the second load 4202 for turning on or off the electrical path between the second load 4202 and the ground. As illustrated in FIG. 5, the control module 4206 is connected between the fourth pin 424 and the second load 4202, for turning on or off the electrical path between the second load 4202 and the ground.

The second unidirectional conduction module 4203 is connected between the first load 4201 and the third load 4204. The third unidirectional conduction module 4205 is connected between the third load 4204 and the second load 4202. The first pin 421 is arranged at a connection point between the second unidirectional conduction module 4203 and the third load 4204 and is connected to the first DC isolating component 430. The second pin 422 is arranged at a connection point between the first load 4201 and the second unidirectional conduction module 4203, and is connected to the second unidirectional conduction component 440. The fifth pin 425 is arranged at a connection point between the second load 4202 and the third unidirectional conduction module 4205, and is connected to the third DC isolating component 450. The sixth pin 426 is arranged at a connection point between the third load 4204 and the third unidirectional conduction module 4205, and is connected to the fourth DC isolating component 460. The second unidirectional conduction module 4203 is configured to turn on the path between the first pin 421 and the second pin 422 in a case that the path between the third pin 423 and the fourth pin 424 is turned on, and to turn off the path between the first pin 421 and the second pin 422 in a case that the path between the third pin 423 and the fourth pin 424 is turned off. The third unidirectional conduction module 4205 is configured to turn on the path between the fifth pin 425 and the sixth pin 426 in a case that the path between the third pin 423 and the fourth pin 424 is turned on, and to turn off the path between the fifth pin 425 and the sixth pin 426 in a case that the path between the third pin 423 and the fourth pin 424 is turned off.

That is, in this embodiment, the second unidirectional conduction module 4202 has such functions. In the case that the path between the third pin 423 and the fourth pin 424 is turned on, the second unidirectional conduction module 4202 is equivalent to a resistor having a very small resistance value, and the AC signal input at the first end 401 of the AC input port 400 may be transmitted to the first end 411 of the AC output port 410 through the first DC isolating component 430, the second unidirectional conduction module 4202 and the second DC isolating component 440. In the case that the path between the third pin 423 and the fourth pin 424 is turned off, the second unidirectional conduction module 4202 is equivalent to a resistor having a very large resistance value, and equivalent to a disconnection point, and the AC signal input at the first end 401 of the AC input port 400 cannot be transmitted through the second unidirectional conduction module 4203 to the first end 411 of the AC output port 410. That is, the path from the first end 401 of the AC input port 400 to the first end 411 of the AC output port 410 is turned off. Similarly, the third unidirectional conduction module 4205 has such functions. In the case that the path between the third pin 423 and the fourth pin 424 is turned on, the third unidirectional conduction module 4205 is equivalent to a resistor having a very small resistance value, and the AC signal input at the second end 402 of the AC input port 400 may be transmitted to the second end 412 of the AC output port 410 through the third DC isolating component 450, the third unidirectional conduction module 4205 and the fourth DC isolating component 460. In the cast that the path between the third pin 423 and the fourth pin 424 is turned off, the third unidirectional conduction module 4205 is equivalent to a resistor having a very large resistance value and equivalent to a disconnection point, and the AC signal input at the second end 402 of the AC input port 400 cannot be transmitted through the third unidirectional conduction module 4205 to the second end 412 of the AC output port 410. That is, the path from the second end 402 of the AC input port 400 to the second end 412 of the AC output port 410 is turned off.

In an alternative implementation solution of embodiments of the present disclosure, the second unidirectional conduction module 4203 may include a second PIN diode. The third unidirectional conduction module 4205 may include a third PIN diode. That is, the second unidirectional conduction module 4203 and the third unidirectional conduction module 4205 each may be implemented by the PIN diode. The PIN diode has a perfect switch-off characteristic when the PIN diode is switched off. When being switched off, the PIN diode is equivalent to a capacitor of 0.2 pF which may block the AC signal between the AC input port 400 and the AC output port 410. That is, the carrier signal from the AC input port 400 to the AC output port 410 is blocked. When the PIN is switched on, the PIN diode is equivalent to a resistor having a resistance value inversely proportional to a conduction current, i.e., the greater the conduction current, the smaller the resistance value. Therefore, the AC signal may be transmitted from the AC input port 400 to the AC output port 410. In an alternative implementation way, the second unidirectional conduction module 4203 and the third unidirectional conduction module 4205 each may be implemented as the PIN diode. Therefore the circuit structure is simple and the cost is low. Certainly, embodiments of the present disclosure are not limited thereto. In addition to the PIN diode, the second unidirectional conduction module 4203 and the third unidirectional conduction module 4205 each may be also implemented in other ways, for example, as an integrated chip, which is not limited in this embodiment.

In an alternative implementation solution of embodiments of the present disclosure, in order to maintain a resonant quality factor value (Q) of the coil connected to the AC input port 400, the first load 4201, the second load 4202 and the third load 4204 have the same resistance value, and the resistance values of the first load 4201, the second load 4202 and the third load 4204 all are greater than a predetermined value. In a specific application, the first load 4201, the second load 4202 and the third load 4202 may be resistors. For example, the first load 4201, the second load 4202 and the third load 4203 each may be a resistor of 1.6 K ohm. Certainly, embodiments of the present disclosure are not limited thereto. In practice, the first load 4201, the second load 4202 and the third load 4204 each may also be another element or component having a certain resistance value, which is not limited in embodiments of the present disclosure.

The resistance value of the first load 4201, the resistance value of the second load 4202 and the resistance value of the third load 4204 may be determined according to the conduction condition of the PIN diode used as the second unidirectional conduction module 4203 and the third unidirectional conduction module 4205. That is, the resistance value of the first load 4201, the resistance value of the second load 4202 and the resistance value of the third load 4204 satisfy the following conditions. In the case that the path between the third pin 423 and the fourth pin 424 is turned on, the resistance value is maximum when a current in the path between the third pin 423 and the fourth pin 424 is not smaller than the conduction current of the PIN diode used as the second unidirectional conduction module 4203 and the third unidirectional conduction module 4205.

In an alternative implementation solution of embodiments of the present disclosure, the apparatus may further include a filter component. An end of the filter component is electrically connected to a connection point between the DC power supply and the third pin 423, and another end of the filter component is connected to the ground end. As an alternative way, the filter component may be a capacitor or another component having a filtering function, which is not limited in this embodiment. The filter component may effectively cancel noise presented in a high level signal of the DC power supply introduced at the third pin 423, so as to smooth the high level signal.

In a specific application, the above first DC isolating component 430, the second DC isolating component 440, the third DC isolating component 450 and the fourth DC isolating component 460 each may be implemented as a capacitor having a capacitance value greater than a predetermined value (that is, the predetermined value enables the capacitor to achieve a DC isolating function, and to turn on the path between two ends of the capacitor, such as the predetermined value is 0.2 pF). Certainly, embodiments of the present disclosure are not limited thereto. In a specific application, this may be realized by another component having the DC isolating function, which is not limited in this embodiment.

Figure 6:
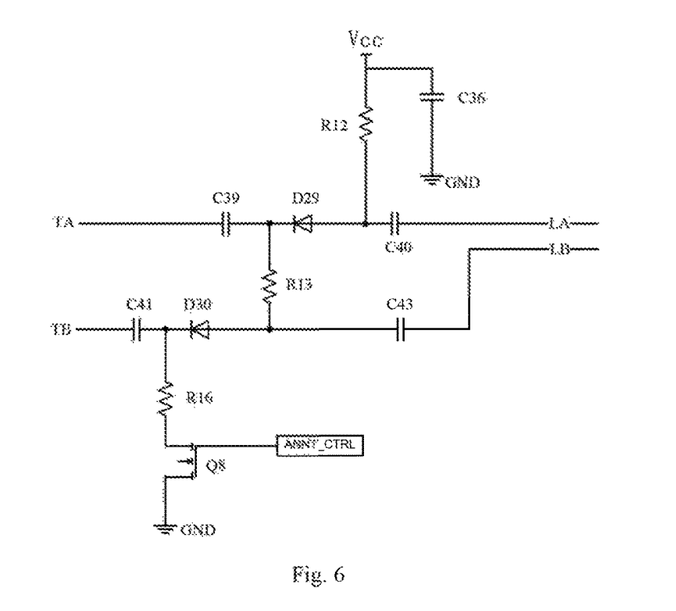
FIG. 6 is a schematic diagram of a circuit principle of an alternative on-off apparatus provided in Embodiment 2 of the present disclosure.

FIG. 6 is a schematic diagram of a circuit principle of an alternative on-off apparatus provided in this embodiment. As illustrate in FIG. 6, in this embodiment, the first end TA of the AC input port is connected in series to a capacitor C39, a PIN diode D29, a capacitor C40 and the first end LA of the AC output port in sequence. An end of a resistor R12 is connected to a connection point between D29 and C40, and another end of the resistor R12 is connected to the DC power supply. An end of a resistor R13 is connected to a connection point between C39 and D29, and another end of the resistor R13 is connected to a connection point between the PIN diode D30 and the capacitor C43. A negative electrode of the PIN diode D29 is connected to the capacitor C39 and a positive electrode of the PIN diode D29 is connected to the capacitor C40. The second end TB of the AC input port is connected in series to a capacitor C41, a PIN diode D30, a capacitor C43 and the second end LB of the AC output port in sequence. A negative electrode of the PIN diode D30 is connected to the capacitor C41, and a positive electrode of the PIN diode D30 is connected to the capacitor C43. An end of a resistor R16 is connected at a connection point between the capacitor C41 and the PIN diode D30, and another end of the resistor R16 is connected to a D electrode of a NMOS transistor Q8. An S electrode of the NMOS transistor Q8 is grounded. A G electrode of the NMOS transistor Q8 is connected to the control pin, for receiving the control signal (ANNT_CTRL). The NMOS transistor Q8 is switched on or off under the control of the control signal, so as to turn on or off the path form the DC power supply to the ground. In a cast that the path from the DC power supply to the ground is turned on, due to the characteristic of the PIN diode that the PIN diode is equivalent to a resistor when switched on, the AC signal input at the first end TA of the AC input port may be transmitted to the first end LA of the AC output port through D29 while the AC signal flowed back from the second end LB of the AC output port may be transmitted to the second end TB of the AC input port through D30 if the AC signal at the first end TA of the AC input port is positive half-cycle. Therefore, a transmission of the AC signal is realized in an entire loop from the AC input port to the AC output port. In addition, since the capacitor has a DC isolating and AC passing function, the DC signal from the DC power supply cannot flow through the capacitors C39 and C40 to the first end TA of the AC input port and the first end LA of the AC output port, and cannot flow through the capacitors C41 and C43 to the second end TB of the AC input port and the second end LB of the AC output port. Therefore, the transmission of the AC signal may be not effected. In a cast that the path from the DC power supply to the ground is turned off, due to the characteristic of the PIN diode, both of D29 and D30 are equivalent to a capacitor of 0.2 pF when switched off, and the AC signal between the AC input end TA and the AC output end LA may be isolated. That is, the carrier signal between the AC input end TA and the AC output end LA is isolated.

Embodiment 3

This embodiment provides an electronic device.

The electronic device provided in this embodiment may include the on-off apparatus described in any implementation solution of Embodiment 1.

Figure 7:
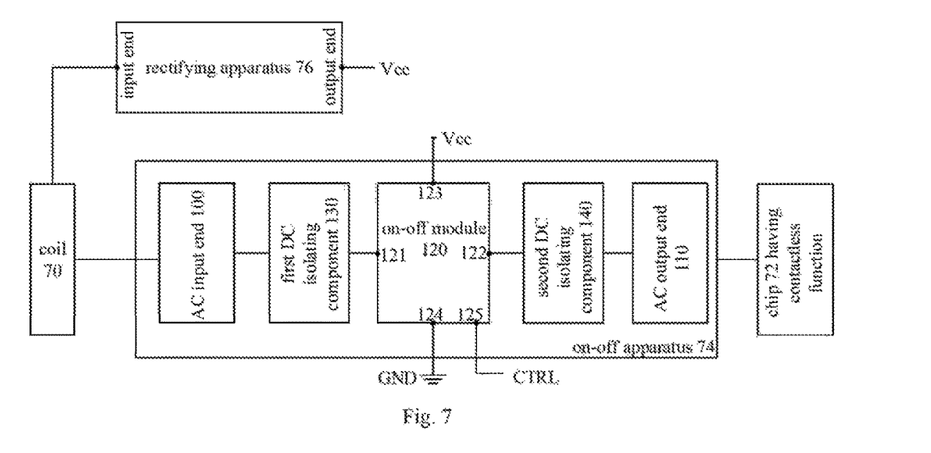
FIG. 7 is a schematic diagram of an electronic device provided in Embodiment 3 of the present disclosure.

FIG. 7 is a schematic diagram of an electronic device provided in this embodiment. As illustrated in FIG. 7, the electronic device provided in this embodiment includes a coil 70, a chip 72 having a contactless function and an on-off apparatus 74 connected between the coil 70 and the chip 72. The coil 70 is connected to an AC input end of the on-off apparatus 74, and the chip 72 having the contactless function is connected to an AC output end of the on-off apparatus 74.

With the electronic device provided in this embodiment, switch-on or switch-off of an on-off module in the on-off apparatus 74 may be controlled by inputting a control signal, thereby connecting the chip 72 having the contactless function to or disconnecting the chip 72 having the contactless function from the coil 70.

The electronic device provided in this embodiment may include, but be not limited to, a smart card or an electronic device having a NFC function. In addition, the electronic device may have functions, such as displaying, inputting or the like. The smart card may further include a security chip. The security chip may be configured to achieve functions such as electronic signature, signature verification, dynamic password generation and verification or the like. The electronic device may communicate with another device (such as a card reader, a POS terminal, a NFC phone or the like) via a wireless manner (such as radio frequency manner, NFC manner or the like). The chip having the contactless function may include, but be not limited to, a smart card chip, or an interface chip having the contactless function. The interface chip may be connected to a central processing unit (CPU). That is, as long as a chip having the contactless function, the chip may be applicable in this embodiment.

In an alternative implementation solution of embodiments of the present disclosure, the coil 70 may be a radio frequency coil or a NFC coil. The coil may operate at 13.56M. A signal received by the coil 70 may include, but be not limited to, a contactless signal, such as a NFC signal, a radio frequency signal or the like. A non-contact manner refers to a contactless manner which requires no electrical connection for communication. When the electronic device is placed in a field (i.e., the electronic device is placed in a radio frequency field of another device such as a card reader, a phone), the chip 72 having the contactless function may perform a near field communication (NFC) with another device by means of the coil 70 in the contactless manner.

In an alternative implementation solution of embodiments of the present disclosure, the chip 72 having the contactless function may be a smart card chip integrated with a microcontroller unit (MCU), and may directly send the control signal to the on-off apparatus 74. Alternatively, the chip 72 having the contactless function may also be an interface chip having the contactless function. The interface chip may be connected to a CPU, and the CPU sends the control signal to the on-off apparatus 74 through the interface chip. Consequently, the on-off apparatus 74 may be controlled to switch on or switch off by the chip 72 having the contactless function. Certainly, embodiments of the present disclosure are not limited thereto. In practice, the control signal may also be input to the on-off apparatus 74 through an input device (such as a key) of the electronic device, which is not limited in this embodiment.

In an alternative implementation solution of embodiments of the present disclosure, as illustrated in FIG. 7, the electronic device may further include a rectifying apparatus 76. The rectifying apparatus 76 is electrically connected to the coil 70 and includes an input end and an output end. The input end of the rectifying apparatus 76 is electrically connected to the coil 70, for receiving an AC signal output by the coil 70. The output end of the rectifying apparatus 76 is configured to output electric energy. With this alternative implementation solution, the rectifying apparatus 76 may share one coil with the chip 72 having the contactless function. By controlling the on-off apparatus 74 to switch on or switch off, the path between the coil 70 and the chip 72 having the contactless function may be turned on or off. Therefore, the coil 70 may provide the electric energy for the rectifying apparatus 76 more effectively.

In an alternative implementation solution of embodiments of the present disclosure, the coil 70 may have two output ends. A first output end of the coil 70 is connected to a first input end of the rectifying apparatus 76, and a second output end of the coil 70 is connected to a second input end of the rectifying apparatus 76. The first output end and the second output end of the coil 76 output the AC signals with opposite phases. When the electronic device is placed in a radio frequency field of another device for a contactless near field communication, the coil 70 of the electronic device is connected respectively to the chip 72 having the contactless function and the rectifying apparatus 76. The coil 70 is used to acquire the electric energy for supplying power to the rectifying apparatus 76 (i.e., a power acquirement circuit). Furthermore, the coil 70 is used to communicate with the chip 72 having the contactless function. The rectifying apparatus 76 rectifies the AC and outputs the rectified AC for providing a power supply for the electronic device. Therefore, in this embodiment, when the electronic device performs the near field communication with another device, the electronic device may acquire the electric energy from the coil of the electronic device to supply power to the electronic device for working or charging a power supply built-in the electronic device, thereby improving a usage rate of the electronic device. In this alternative implementation solution, the on-off apparatus 74 is connected between the coil 70 and the chip 72 having the contactless function. The on-off apparatus 74 controls the path between the coil 70 and the chip 72 having the contactless function to turn on or off by receiving the control signal. When the control signal indicating to turn off the path between the coil 70 and the chip 72 having the contactless function is received, the on-off apparatus 74 turns off the path between the coil 70 and the chip 72 having the contactless function. Therefore, the radio frequency carrier between the chip 72 having the contactless function and the coil 70 is turned off. Without the effect of the chip 72 having the contactless function, all of the current of the coil 70 flows into the rectifying apparatus 76 such that the rectifying apparatus 76 may acquire the electric energy at a maximum effectiveness.

In this embodiment, the rectifying apparatus 76 may include a unidirectional conduction component such as a diode, which may specifically be a bridge circuit formed of 4 diodes, for rectifying the electric energy output by the coil to output the electric energy.

In an alternative implementation solution of embodiments of the present disclosure, an output end of the rectifying apparatus 76 is connected to another apparatus required to be powered in the electronic device 70, such as a display screen, a key, a security chip or the like, so as to maintain normal operation of another apparatus required to be powered. Therefore, it does not need to provide additional electric energy for another apparatus, thereby saving energy.

In an alternative implementation solution of embodiments of the present disclosure, the output end of the rectifying apparatus 76 may be electrically connected to the on-off apparatus 74, for providing the DC power supply for the on-off module of the on-off apparatus 74. That is, the output end of the rectifying apparatus 76 may function as the DC power supply of Embodiment 1. With this alternative implementation solution, the electric energy provided by the coil 70 may be fully used without providing an additional DC power supply for the on-off apparatus 74, thereby saving a size and manufacturing cost of the electronic device.

The on-off apparatus 74 in this embodiment may adopt any alternative implementation solution described in Embodiment 1. For details, the descriptions made to Embodiment 1 may be referred to, which is not described in detail in this embodiment.

Embodiment 4

The electronic device provided in this embodiment may include an on-off apparatus described in any implementation solution of Embodiment 2.

Figure 8:
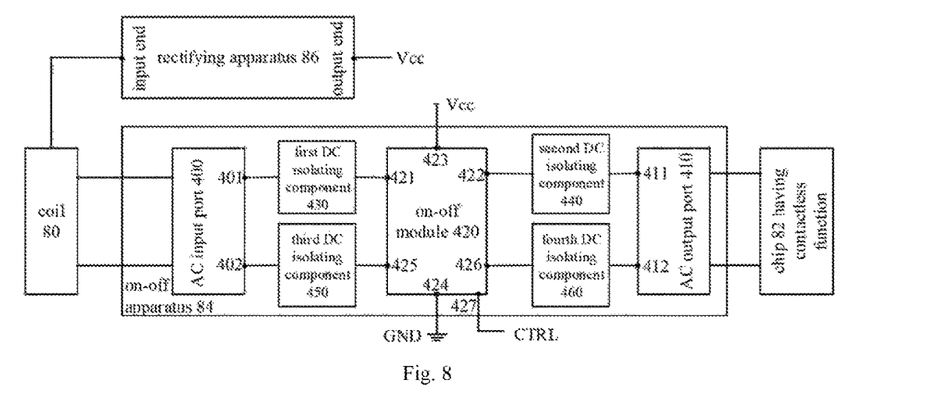
FIG. 8 is a schematic diagram of an electronic device provided in Embodiment 4 of the present disclosure.

FIG. 8 is a schematic diagram of an electronic device provided in this embodiment. As illustrated in FIG. 8, the electronic device provided in this embodiment includes a coil 80, a chip 82 having a contactless function and an on-off apparatus 84 connected between the coil 80 and the chip 82 having the contactless function. The coil 80 is connected to an AC input end of the on-off apparatus 84, and the chip 82 having the contactless function is connected to an AC output end of the on-off apparatus 84.

With the electronic device provided in this embodiment, switch-on and switch-off of an on-off module in the on-off apparatus 84 may be controlled by inputting a control signal, thereby connecting the chip 82 having the contactless function to or disconnecting the chip 82 having the contactless function from the coil 80.

As illustrate in FIG. 8, the electronic device provided in this embodiment is different from the electronic device provided in Embodiment 3 at that, the on-off apparatus described in Embodiment 2 is adopted in this embodiment. That is, in this embodiment, the coil and the chip having the contactless function are connected to each other via two lines, and a loop is formed with the two lines. In Embodiment 3, the coil and the chip having the contactless function are connected to each other via a single line, and the coil and the chip having the contactless function are commonly grounded to form the loop.

In an alternative implementation solution of embodiments of the present disclosure, as illustrated in FIG. 8, the electronic device may further include a rectifying apparatus 86. The rectifying apparatus 86 is electrically connected to the coil 80, and includes an input end and an output end. The input end of the rectifying apparatus 86 is electrically connected to the coil 80, for receiving an AC signal output by the coil 80. The output end of the rectifying apparatus 86 is configured to output electric energy. With this alternative implementation solution, the rectifying apparatus 86 may share one coil with the chip 82 having the contactless function. By controlling the on-off apparatus 84 to switch on or switch off, the path between the coil 80 and the chip 82 having the contactless function may be turned on or off. Therefore, the coil 80 may provide the electric energy for the rectifying apparatus 86 more effectively.

In an alternative implementation solution of embodiments of the present disclosure, the coil 80 may have two output ends. A first output end of the coil 80 is connected respectively to a first input end of the rectifying apparatus 86 and a first end of an AC input end of the on-off apparatus 84. A second output end of the coil 80 is connected respectively to a second input end of the rectifying apparatus 86 and a second end of the AC input end of the on-off apparatus 84. The first output end and the second output end of the coil 86 output the AC signals having opposite phases. A first end of an AC output end of the on-off apparatus 84 is connected to a first end of the chip 82 having the contactless function. A second end of the AC output end of the on-off apparatus 84 is connected to a second end of the chip 82 having the contactless function. When the electronic device is placed in a radio frequency of another device for a contactless near field communication, the coil 80 of the electronic device is connected to the chip 82 having the contactless function through the on-off module 84. Furthermore, the coil 80 of the electronic device is also connected to the rectifying apparatus 86. The coil 80 is used to acquire the electric energy for supplying power to the rectifying module 86 (i.e., a power acquirement circuit). Furthermore, the coil 80 is used to communicate with the chip 82 having the contactless function. The rectifying apparatus 88 rectifies the AC and outputs the rectified AC for providing power for the electronic device. Therefore, in this embodiment, when the electronic device performs the near field communication with another device, the electronic device may acquire the electric energy from the coil of the electronic device to supply power to the electronic device for working or charging a power supply built-in the electronic device, thereby improving a usage rate of the electronic device. In this alternative implementation solution, the on-off apparatus 84 is connected between the coil 80 and the chip 82 having the contactless function. The on-off apparatus 84 controls the path between the coil 80 and the chip 82 having the contactless function to turn on or off by receiving the control signal. When the control signal indicating to turn off the path between the coil 80 and the chip 82 having the contactless function is received, the on-off apparatus 84 turns off the path between the coil 80 and the chip 82 having the contactless function. Therefore, the radio frequency carrier between the chip 82 having the contactless function and the coil 80 is turned off. Without effect of the chip 82 having the contactless function, all of the current of the coil 80 flow into the rectifying apparatus 86, such that the rectifying apparatus 86 may acquire the electric energy at a maximum effectiveness.

In this embodiment, the rectifying apparatus 86 may include a unidirectional conduction component such as a diode, which may specifically be a bridge circuit formed of 4 diodes, for rectifying the electric energy output by the coil to output the electric energy.

In an alternative implementation solution of embodiments of the present disclosure, an output end of the rectifying apparatus 86 is connected to another apparatus required to be powered in the electronic device 80, such as a display screen, a key, a security chip or the like, so as to maintain normal operation of another apparatus required to be powered. Therefore, it does not need to provide additional electric energy for another apparatus, thereby saving energy.

In an alternative implementation solution of embodiments of the present disclosure, the output end of the rectifying apparatus 86 may be electrically connected to the on-off apparatus 84, for providing the DC power supply for the on-off module of the on-off apparatus 84. That is, the output end of the rectifying apparatus 86 may function as the DC power supply of Embodiment 2. With this alternative implementation solution, the electric energy provided by the coil 80 may be fully used without providing an additional DC power supply for the on-off apparatus 84 separately, thereby saving a size and manufacturing cost of the electronic device.

The on-off apparatus 84 in this embodiment may adopt any alternative implementation solution described in Embodiment 2. For details, the descriptions made to Embodiment 2 may be referred to, which is not described in detail in this embodiment.

Figure 9:
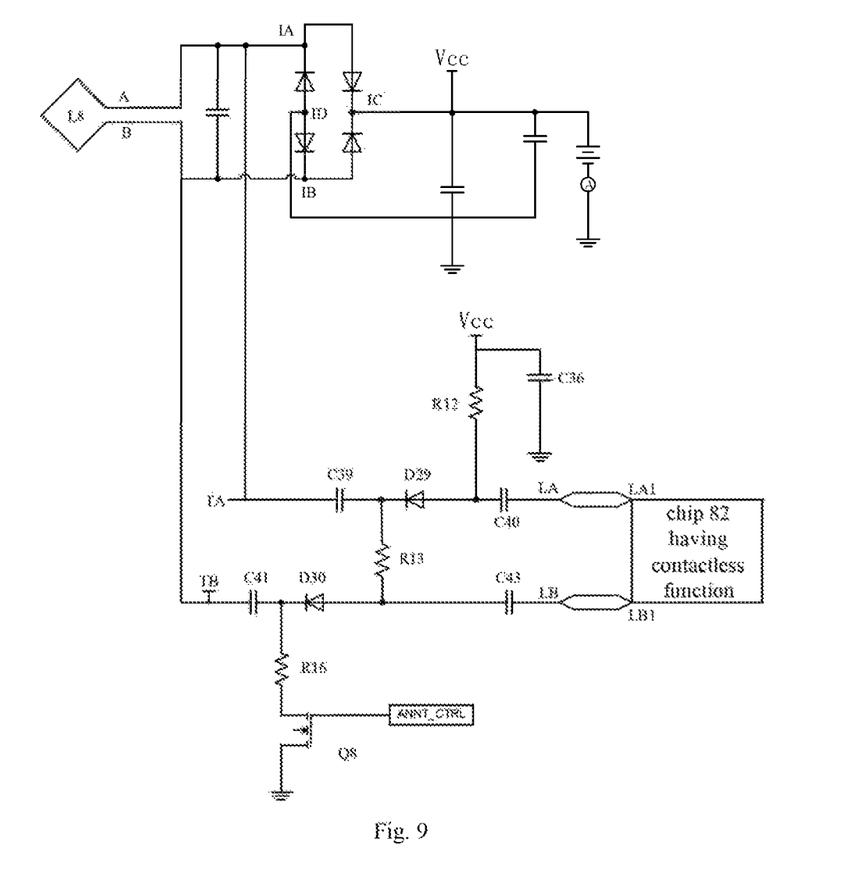
FIG. 9 is a schematic diagram of a circuit principle of an electronic device provided in Embodiment 4 of the present disclosure.

FIG. 9 is a schematic diagram of a circuit principle of an alternative electronic device provided in this embodiment. As illustrated in FIG. 9, in this embodiment, the rectifying apparatus 86 may use four diodes to form a "bridge" typed structure, i.e., a full-wave rectifying circuit. An end IB of the diode rectifying bridge is connected to the first input end B of the coil, and another end IA of the diode rectifying bridge is connected to the second input end A of the coil. A rectifying circuit may also be adopted in the chip 82 having the contactless function. The rectifying circuit adopts a similar diode rectifying bridge to the rectifying apparatus 86. The IA end of the diode rectifying bridge in the chip 82 is connected to the first end LA of the AC output end of the on-off apparatus 84, and the IB terminal of the diode rectifying bridge in the chip 82 is connected to the second end LB of the AC output end of the on-off apparatus 84.

As illustrated in FIG. 9, the first output end B of the coil L8 (i.e. an antenna of the electronic device) is connected to the second end TB of the AC input end of the on-off apparatus 84. The second output end A of the coil L8 is connected to the first end TA of the AC input end of the on-off apparatus 84. The second end LB of the AC output end of the on-off apparatus 84 is connected to the input end LB1 of the chip 82 having the contactless function. The first end LA of the AC output end of the on-off apparatus 84 is connected to the input end LA1 of the chip 82 having the contactless function. The control pin of the on-off apparatus 84 is configured to receive the control signal ANNT_CTRL. As illustrated in FIG. 9, the on-off apparatus 84 adopts a circuit structure as illustrated in Embodiment 2, Specific connections of components of the on-off apparatus and the principle of the on-off apparatus may be referred to the descriptions made to FIG. 6 in Embodiment 2.

Now, the working principle of the electronic device provided in embodiments of the present disclosure will be described taking that the second output end B of the coil is high level and the first output end A of the coil is low level as an example. When the control signal ANNT_CTRL outputted at an external control pin is high level, the NMOS transistor Q8 is turned on, a DC path, i.e. a path V_PWR . . . >R12 . . . >D29 . . . >R13 . . . >D30 . . . >R16 . . . >Q8 . . . >GND is turned on. Each of D29 and D30 is equivalent to a resistor having a small resistance value. Due to the high level at the first end TB of the AC input end of the on-off apparatus 84 and the low level at the second end TA of the AC input end of the on-off apparatus 84, a flowing direction of the AC signal is shown as: B of the coil L8 . . . >TB . . . >capacitor C41 . . . >PIN diode D30 . . . > capacitor C43 . . . >LB . . . >input end LB1 of the chip 82 . . . >(inter of the chip) . . . >input end LA1 of the chip 82 . . . >LA . . . >capacitor C40 . . . >PIN diode D29 . . . > capacitor C39 . . . >TA . . . >A of the coil L8. When the control signal ANNT_CTRL outputted at the external control pin is low level, the NMOS transistor Q8 is turned off, the DC is blocked, i.e., the path V_PWR . . . >R12 . . . > D29 . . . >R13 . . . >D30 . . . >R16 . . . >Q8 . . . >GND is turned off. Each of the D29 and D30 is equivalent to a capacitor of 0.2 pF, which has an AC isolating function. The AC signal cannot be transmitted from TB to LB, thereby isolating the carrier signal between the coil and the chip having the contactless function.

Certainly, if the first output end B of the coil is low level, and the second output end A of the coil is high level, the principle is same with the principle described above, which is not described herein.

The above-mentioned storage medium may be a read-only memory, a magnetic disc, an optical disc, etc.

Reference throughout this specification to "an embodiment," "some embodiments," "example," "a specific example," or "some examples," means that a particular feature, structure, material, or characteristic described in connection with the embodiment or example is included in at least one embodiment or example of the present disclosure. Thus, the exemplary descriptions of the phrases are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be understood that the above embodiments are exemplary and cannot be construed to limit the present disclosure, and those skilled in the art can make changes, alternatives, replacements and modifications in the embodiments without departing from principles and scope of the present disclosure. The scope of the present disclosure is defined by the claims and their equivalents.

What is claimed is:

1. An on-off apparatus, comprising an alternating current (AC) input end, an AC output end, an on-off module, a first direct current (DC) isolating component and a second DC isolating component;
wherein, the on-off module comprises a first pin, a second pin, a third pin, a fourth pin and a control pin, the third pin is electrically connected to a DC power supply, the fourth pin is connected to a ground end, and the control pin is configured to receive a control signal; the on-off module is configured to turn on or off a path between the third pin and the fourth pin under control of the control signal; when the path between the third pin and the fourth pin is turned on, a path between the first pin and the second pin is turned on; when the path between the third pin and the fourth pin is turned off, the path between the first pin and the second pin is turned off;
the first DC isolating component is connected between the AC input end and the first pin, the first DC isolating component is configured to isolate a DC signal between the first pin and the AC input end, and to transmit an AC signal between the first pin and the AC input end;
the second DC isolating component is connected between the AC output end and the second pin, the second DC isolating component is configured to isolate a DC signal between the second pin and the AC output end, and to transmit an AC signal between the second pin and the AC output end.

2. The on-off apparatus according to claim 1, wherein the on-off module comprises a first load, a second load, a control module and a first unidirectional conduction module,
the control module is connected to the control pin, and the control module is connected between the third pin and the first load, or the control module is connected between the fourth pin and the second load, and is configured to turn on or off the path between the third pin and the fourth pin under the control of the control signal;
the first unidirectional conduction module is connected between the first load and the second load and between the first pin and the second pin, and is configured to turn on the path between the first pin and the second pin when the path between the third pin and the fourth pin is turned on, and to turn off the path between the first pin and the second pin when the path between the third pin and the fourth pin is turned off.

3. The on-off apparatus according to claim 2, wherein the first unidirectional conduction module comprises a first positive-intrinsic-negative (PIN) diode.

4. The on-off apparatus according to claim 2, wherein the first load has the same resistance value with the second load, and a resistance value of the first load or a resistance value of the second load is greater than a predetermined value.

5. The on-off apparatus according to claim 2, further comprising a filter component, wherein an end of the filter component is electrically connected to a connection point between the DC power supply and the third pin, and another end of the filter component is connected to the ground end.

6. The on-off apparatus according to claim 1, further comprising a filter component, wherein an end of the filter component is electrically connected to a connection point between the DC power supply and the third pin, and another end of the filter component is connected to the ground end.

7. An on-off apparatus, comprising an alternating current (AC) input port, an AC output port, an on-off module, a first direct current (DC) isolating component, a second DC isolating component, a third DC isolating component and a fourth DC isolating component; wherein
the AC input port comprises a first end and a second end;
the AC output port comprises a first end and a second end;
the on-off module comprises a first pin, a second pin, a third pin, a fourth pin, a fifth pin, a sixth pin and a control pin;
the third pin is electrically connected to a DC power supply, and the fourth pin is connected to a ground end;
the first DC isolating component is connected between the first end of the AC input port and the first pin, and the first DC isolating component is configured to isolate a DC signal between the first pin and the first end of the AC input port, and to transmit an AC signal between the first pin and the first end of the AC input port;
the second DC isolating component is connected between the first end of the AC output port and the second pin, and the second DC isolating component is configured to isolate a DC signal between the second pin and the first end of the AC output port, and to transmit an AC signal between the second pin and the first end of the AC output port;
the third DC isolating component is connected between the second end of the AC input port and the fifth pin, and the third DC isolating component is configured to isolate a DC signal between the fifth pin and the second end of the AC input port, and to transmit an AC signal between the fifth pin and the second end of the AC input port;
the fourth DC isolating component is connected between the second end of the AC output port and the sixth pin, and the fourth DC isolating component is configured to isolate a DC signal between the sixth pin and the second end of the AC output port, and to transmit an AC signal between the sixth pin and the second end of the AC output port;
the control pin is configured to receive a control signal;
the on-off module is configured to turn on or off a path between the third pin and the fourth pin under control of the control signal, when the path between the third pin and the fourth pin is turned on, a path between the first pin and the second pin is turned on, and a path between the fifth pin and the sixth pin is turned on; when the path between the third pin and the fourth pin is turned off, the path between the first pin and the second pin is turned off, and the path between the fifth pin and the sixth pin is turned off.

8. The on-off apparatus according to claim 7, wherein the on-off module comprises a first load, a second load, a second unidirectional conduction module, a third load, a third unidirectional conduction module and a control module;
the control module is connected to the control pin, and the control module is connected between the third pin and the first load, or the control module is connected between the fourth pin and the second load, and is configured to turn on or off the path between the third pin and the fourth pin under the control of the control signal;

the second unidirectional conduction module is connected between the first load and the third load, and the third unidirectional conduction module is connected between the third load and the second load;

the first pin is arranged at a connection point between the second unidirectional conduction module and the third load, and is connected to the first DC isolating component;

the second pin is arranged at a connection point between the first load and the second unidirectional conduction module, and is connected to the second DC isolating component;

the fifth pin is arranged at a connection point between the second load the third unidirectional conduction module, and is connected to the third DC isolating component;

the sixth pin is arranged at a connection point between the third load and the third unidirectional conduction module, and is connected to the fourth DC isolating component;

the second unidirectional conduction module is configured to turn on the path between the first pin and the second pin when the path between the third pin and the fourth pin is turned on, and to turn off the path between the first pin and the second pin when the path between the third pin and the fourth pin is turned off;

the third unidirectional conduction module is configured to turn on a path between the fifth pin and the sixth pin when the path between the third pin and the fourth pin is turned on, and to turn off the path between the fifth pin and the sixth pin when the path between the third pin and the fourth pin is turned off.

9. The on-off apparatus according to claim 8, wherein the second unidirectional conduction module comprises a second PIN diode; and the third unidirectional conduction module comprises a third PIN diode.

10. The on-off apparatus according to claim 8, wherein the first load, the second load and the third load have the same resistance value, and a resistance value of the first load, a resistance value of the second load or a resistance value of the third load is greater than a predetermined value.

11. The on-off apparatus according to claim 8, wherein the first load has the same resistance value with the second load, and a resistance value of the first load or a resistance value of the second load is greater than a predetermined value.

12. The on-off apparatus according to claim 8, further comprising a filter component, wherein an end of the filter component is electrically connected to a connection point between the DC power supply and the third pin, and another end of the filter component is connected to the ground end.

13. The on-off apparatus according to claim 9, wherein the first load has the same resistance value with the second load, and a resistance value of the first load or a resistance value of the second load is greater than a predetermined value.

14. The on-off apparatus according to claim 9, further comprising a filter component, wherein an end of the filter component is electrically connected to a connection point between the DC power supply and the third pin, and another end of the filter component is connected to the ground end.

15. The on-off apparatus according to claim 7, further comprising a filter component, wherein an end of the filter component is electrically connected to a connection point between the DC power supply and the third pin, and another end of the filter component is connected to the ground end.

16. An electronic device, comprising a coil, a chip having a contactless function and an on-off apparatus, wherein the on-off apparatus comprises: an alternating current (AC) input port, an AC output port, an on-off module, a first direct current (DC) isolating component, a second DC isolating component, a third DC isolating component and a fourth DC isolating component, in which the AC input port comprises a first end and a second end;

the AC output port comprises a first end and a second end;

the on-off module comprises a first pin, a second pin, a third pin, a fourth pin, a fifth pin, a sixth pin and a control pin;

the third pin is electrically connected to a DC power supply, and the fourth pin is connected to a ground end;

the first DC isolating component is connected between the first end of the AC input port and the first pin, and the first DC isolating component is configured to isolate a DC signal between the first pin and the first end of the AC input port, and to transmit an AC signal between the first pin and the first end of the AC input port;

the second DC isolating component is connected between the first end of the AC output port and the second pin, and the second DC isolating component is configured to isolate a DC signal between the second pin and the first end of the AC output port, and to transmit an AC signal between the second pin and the first end of the AC output port;

the third DC isolating component is connected between the second end of the AC input port and the fifth pin, and the third DC isolating component is configured to isolate a DC signal between the fifth pin and the second end of the AC input port, and to transmit an AC signal between the fifth pin and the second end of the AC input port;

the fourth DC isolating component is connected between the second end of the AC output port and the sixth pin, and the fourth DC isolating component is configured to isolate a DC signal between the sixth pin and the second end of the AC output port, and to transmit an AC signal between the sixth pin and the second end of the AC output port;

the control pin is configured to receive a control signal;

the on-off module is configured to turn on or off a path between the third pin and the fourth pin under control of the control signal, when the path between the third pin and the fourth pin is turned on, a path between the first pin and the second pin is turned on, and a path between the fifth pin and the sixth pin is turned on; when the path between the third pin and the fourth pin is turned off, the path between the first pin and the second pin is turned off, and the path between the fifth pin and the sixth pin is turned off, the coil is connected to the AC input port of the on-off apparatus, and the chip having the contactless function is connected to the AC output port of the on-off apparatus.

17. The electronic device according to claim 16, further comprising a rectifying apparatus, wherein the rectifying apparatus is electrically connected to the coil, and comprises an input end and an output end, the input end of the rectifying apparatus is electrically connected to the coil and is configured to receive an AC signal output by the coil, and the output end of the rectifying apparatus is configured to output electric energy.

18. The electronic device according to claim 17, wherein the output end of the rectifying apparatus is electrically connected to the on-off apparatus and is configured to provide the DC power supply for the on-off module.

* * * * *